(12) United States Patent
William

(10) Patent No.: US 10,949,410 B2
(45) Date of Patent: Mar. 16, 2021

(54) MULTI-THREADED DATA ANALYTICS

(71) Applicant: SAP SE, Walldorf (DE)

(72) Inventor: John Alex William, Trichy (IN)

(73) Assignee: SAP SE, Walldorf (DE)

( * ) Notice: Subject to any disclaimer, the term of this patent is extended or adjusted under 35 U.S.C. 154(b) by 767 days.

(21) Appl. No.: 14/956,391

(22) Filed: Dec. 2, 2015

(65) Prior Publication Data

US 2017/0161309 A1 Jun. 8, 2017

(51) Int. Cl.
G06F 16/22 (2019.01)
G06F 16/28 (2019.01)
G06F 16/23 (2019.01)

(52) U.S. Cl.
CPC ...... *G06F 16/2282* (2019.01); *G06F 16/2393* (2019.01); *G06F 16/288* (2019.01)

(58) Field of Classification Search
CPC . G06F 16/2282; G06F 16/288; G06F 16/2393
See application file for complete search history.

(56) References Cited

U.S. PATENT DOCUMENTS

| | | | |
|---|---|---|---|
| 7,333,982 B2* | 2/2008 | Bakalash | G06F 16/2455 707/600 |
| 2002/0035565 A1* | 3/2002 | Shah | G06F 17/30398 |
| 2008/0288522 A1* | 11/2008 | Hunt | G06Q 10/06 |
| 2012/0084257 A1* | 4/2012 | Bansode | G06F 17/30309 707/638 |
| 2016/0019249 A1* | 1/2016 | Gunjan | G06F 16/2264 707/715 |

* cited by examiner

*Primary Examiner* — James Trujillo
*Assistant Examiner* — Kurt A Mueller
(74) *Attorney, Agent, or Firm* — Fish & Richardson P.C.

(57) ABSTRACT

Various embodiments of systems and methods to provide multi-threaded data analytics. In one aspect, a master view table is generated by retrieving data records corresponding to a plurality of entities from one or more data source tables. A plurality of aspects are determined from the generated master view table. Further, a plurality of aspect relational view tables are generated by comparing the plurality of aspects with one another based on relationship factors. At least one insight of the data records are determined by analyzing the plurality of aspect relational view tables and the master view table in multi-thread.

17 Claims, 5 Drawing Sheets

| PRODUCT NAME 310 | PRODUCT CATEGORY 320 | PURCHASE TIME 330 | QUANTITY SOLD 340 | CUSTOMER GENDER 350 | BRANCH 360 |
|---|---|---|---|---|---|
| CARROT | VEGETABLES | 10/06/2015/ 9:15:10 | 3 | FEMALE | INDIRANAGAR |
| ONION | VEGETABLES | 11/06/2015/ 18:30:15 | 2 | MALE | WHITEFIELD |
| APPLE | FRUITS | 12/06/2015/ 12:20:22 | 4 | FEMALE | INDIRANAGAR |
| ORANGE | FRUITS | 13/06/2015/ 19:13:11 | 2 | MALE | WHITEFIELD |

FIG. 3

```
PurchaseTimeAspect.analyzePeriodOfDat()
{
  masterAspects[] = get all aspects associated with master view.
  morningResultSet[] = array of resultset, derived by morningperiod with each masterAspect
  eveningResultSet = array of resultset, derived by evening period with each masterAspect For each row of master result set with a new local iterator
  {
    For each row of currentAnalysis result set
    {
      if(Day Period equals to Morning)              ⎫ 410
      {
        add information to morningResultset[Category]
        add information to morningResultset[Branch]      ⎫ 430
        add information to morningResultset[Gender]
      }
      else if(Day Period equals to Evening)         ⎫ 420
      {
        add information to morningResultset[Category]
        add information to morningResultset[Branch]
        add information to morningResultset[Gender]
      }
    }
  }
}
```

FIG. 4

MULTI-THREADED DATA ANALYTICS

BACKGROUND

Data analytics may assist in analyzing data to measure performance and to gain insight for future planning of an organization. Thereby, data analytics is used to make better business decisions to verify existing models or theories. However, due to exponential increase in the data and data structure update, there exists challenges in analyzing the data. For example, a data analyst may need to re-calculate or re-design analytical reports as per the new data changes and as per the new data structure update. Further, multiple complex queries may be written for fetching relevant data from the data repository for analysis.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

FIG. 3 is an exemplary master view table, according to an embodiment.

FIG. 4 is an exemplary algorithm associated with an aspect analyzer, according to an embodiment.

DETAILED DESCRIPTION

Embodiments of techniques to provide multi-threaded data analytics are described herein. In the below description, numerous specific details are set forth to provide a thorough understanding of embodiments. One skilled in the relevant art will recognize, however that the embodiments can be practiced without one or more of the specific details or with other methods, components, techniques, etc. In other instance, well-known operations or structures are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

In this document, various methods, processes and procedures are detailed. Although particular steps may be described in a certain sequence, such sequence is mainly for convenience and clarity. A particular step may be repeated more than once, may occur before or after other steps (even if those steps are otherwise described in another sequence), and may occur in parallel with other steps. Situation where upon completion of the first step, a second step is executed. Such a situation will be specifically pointed out when not clear from the context. A particular step may be omitted. A particular step is required only when its omission would materially impact another step.

In this document, various computer-implemented methods, processes and procedures are described. It is to be understood that the various actions (retrieving, identifying, generating, storing, determining, etc.) are performed by a hardware device (e.g., computing system), even if the action may be authorized, initiated or triggered by a user, or even if the hardware device is controlled by a computer program, software, firmware, and the like. Further, it is to be understood that the hardware device is operating on data, even if the data may represent concepts or real-world objects, thus the explicit labeling as "data" as such is omitted.

Figure 1:
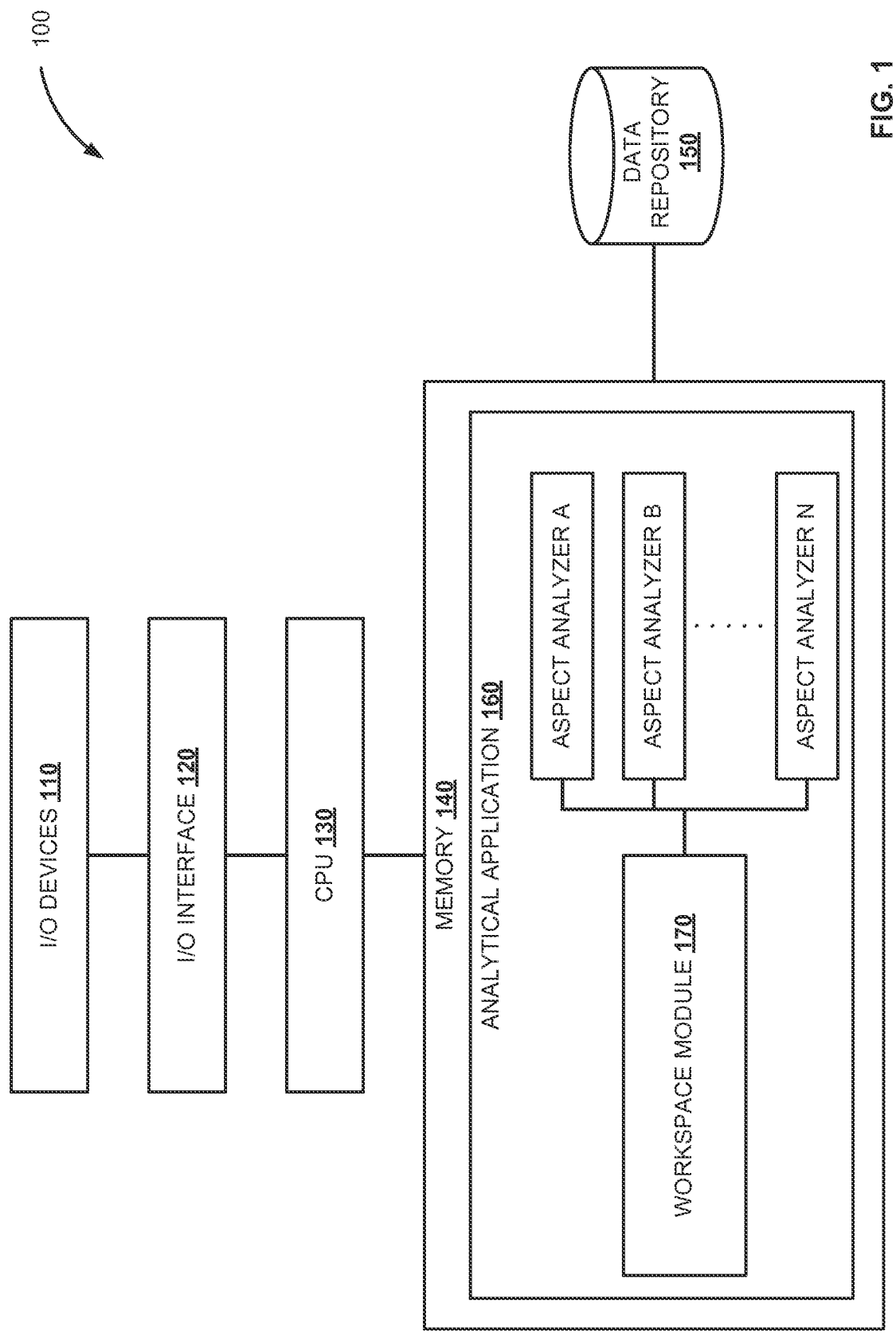
FIG. 1 is a block diagram illustrating an example of a computing system in which an environment described herein may be implemented, according to an embodiment.

FIG. 1 is a block diagram illustrating an example of computing system 100 in which an environment described herein may be implemented, according to an embodiment. The computing system 100 can be a machine capable of performing configured operations. The computing system can be, but not limited to a desktop computer, a laptop computer, a cellular telephone, or an appropriate combination of two or more of such devices or other data processing devices, that is capable of executing analytical applications.

The computing system 100 may include one or more input/output (I/O) devices 110 for a user to interact with the computing system 100 (e.g., for the user to enter input for an application execution and/or for the computing system 100 to provide results of the application execution) using I/O interface 120. The I/O interface 120 provides a mechanism to transfer information between the I/O devices 110 and central processing unit (CPU) 130 of the computing system 100.

The CPU 130 can be in electronic communication with a non-transitory computer-readable storage medium (e.g., memory 140) through a high speed memory bus, for instance. In one exemplary embodiment, the computer-readable storage medium stores program code. Further, the code may be configured to reference data stored in a database, e.g., on the non-transitory computer-readable storage medium. The CPU 130 executes the instructions stored in the memory 140 by accessing relevant data stored one or more data stores (e.g., data repository 150). For example, the data repository 150 includes a number of data source tables such as, but not limited to data source tables corresponding to "customers", "products", "orders", "bills" and "employees."

In one embodiment, the memory 140 includes program code associated with an analytical application (e.g., analytical application 160). The analytical application 160 can be a set of computer programs designed to perform a group of coordinated functions, tasks, or activities, such as to determine insights of data records by performing multi-threaded analytics of the data records. The analytical application 160 includes one or more workspace modules (e.g., workspace module 170) based on objectives of analytics. For example, purchase related analytics such as "sales in a marketplace" can be performed in a workspace module and employee related analytics such as "behavior of employees" can be performed in another workspace module.

In one embodiment, the workspace module 170 generates a master view table based on the objective of an analysis by retrieving (e.g., partially or completely) the data source tables. The workspace module 170 may include a number of aspect analyzers (e.g., aspect analyzer A to aspect analyzer N) analyzing aspects associated with the master view table to determine insights of the data records in the master view table. Further, the aspect analyzers (e.g., aspect analyzer A to aspect analyzer N) may analyze the data records in parallel (e.g., multi-threaded operation). Thereby, the workspace module 170 includes a workspace to generate the master view table. Further, according to the applicable aspects in the master view table, the aspect analyzers (e.g., aspect analyzer A to aspect analyzer N) analyze the aspects in parallel multi-threads to determine different insights of the data records for identifying efficiencies, problem areas, and possible improvements.

Figure 2:
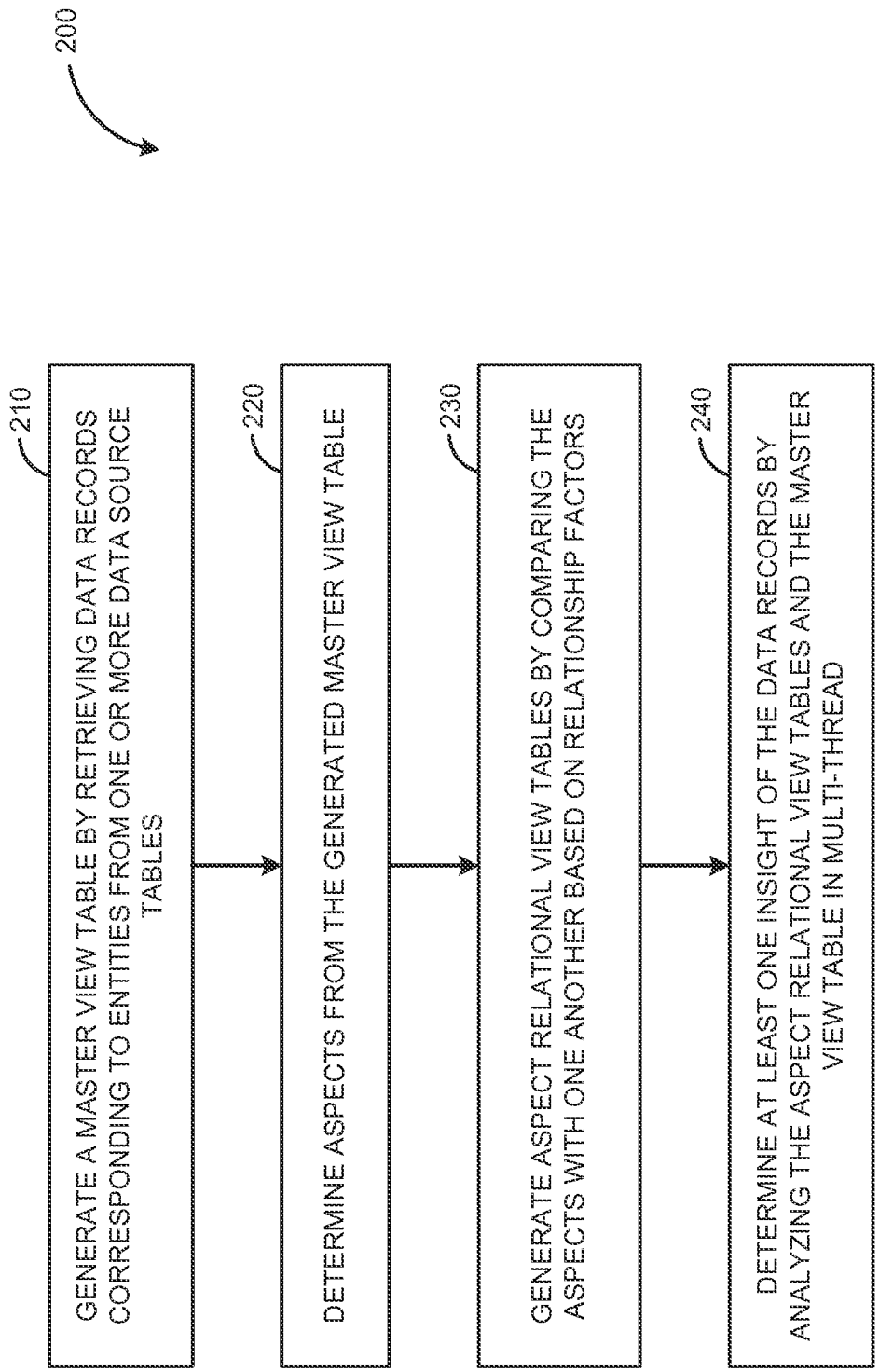
FIG. 2 is a flow diagram illustrating an example process to provide multi-threaded data analytics, according to an embodiment.

FIG. 2 is a flow diagram illustrating example process 200 to provide multi-threaded data analytics, according to an embodiment. The process 200 can be implemented in analytical applications, which enables analyzing data records. For example, the analytical application can be, but are not limited to Webi®, Crystal Reports®, Design Studio® and Lumira® of SAP SE.

At 210, a master view table is generated by retrieving data records corresponding to entities from one or more data source tables. A data repository may include multiple data source tables pertaining to "products", "purchase", "bills" "purchaser", "employees" and the like. The data source tables may include data fields, referred as entities. For example, the "purchase" data source table may include entities such as "bill number", "product item", "quantity" and "discount." The "products" data source table may include entities such as "product name", "product category" and "branch." The "purchaser" data source table may include "purchaser gender", "purchase time" and "purchaser age." The "bills" data source table may include entities such as "bill number" and "purchase data."

In one exemplary embodiment, an entity can be either a newly created entity or the entity can be extended from another entity. For example, the entity "purchase time" can be extended from another entity "base time." The entity "base time" may include details such as year wise, quarter wise (e.g., Q1,Q2 . . . ), month wise (e.g., January, February and the like) and time. The entity "purchase time" may include date (year, month and day) and time from the entity "base time." In one exemplary embodiment, based on an objective of data analytics, the entities associated with the data source tables are retrieved to generate the master view table including a master result set. For example, to analyze "sales in a marketplace", the entities such as "product name", "quantity", "discount", "purchaser age", "bill number" are retrieved from the data source tables "products", "bills" and "purchaser." Also, the data source tables from which the entities are retrieved can be referred to as key tables. In one example, the master view table can be generated using below query (1).

Create view masterview as select *c*.ProductType,
  *a*.productitem,*a*.quantity,*a*.discount,*b*.age,
  *a*.billnumber from purchase as *a*,bills as *b*,Pro-
  ductDetail as *c* where
  *a*.billnumber=*b*.billnumber and
  *c*.ProductItem=*a*.productitem  (1)

At 220, a number of aspects are determined from the generated master view table. In one exemplary embodiment, values of the entity can be further grouped and identified based on the entity's characteristics. Thereby, the master view table is a main result set, which can be reused for further analysis. For example, the entities with a number of characteristics associated with the entities are specified in Table 1.

TABLE 1

| Entity | Characteristics |
|---|---|
| Product Item Cost | Price Range, Profit, Margin |
| Product Item | Brand, Type (e.g., clothes, electronics, food), availability (e.g., local foreign) |
| Purchase Time (Extended from BaseTime) | Day season (e.g., morning, afternoon, evening, night), Week Season (e.g., weekdays, weekends), Month Season (e.g., start, mid, end), Work (e.g., working day, holiday) |
| Purchaser | Age Group (e.g., kids, youths and senior citizens), Gender |
| Discount | Offer Percentage, Amount, Quantity (e.g., buy one get one) |

Further, as the "purchase time" entity can be an extended entity of "base time", the "purchase time" entity can have characteristics of the "base time" entity as depicted in Table 2.

TABLE 2

| Entity | Characteristics |
|---|---|
| Base Time | Year wise, Quarter wise (e.g., Q1, Q2 . . .), Month wise (e.g., January, February and the like) |

In one exemplary embodiment, the entity and one of the characteristics form an aspect. In other words, the aspect identifies a characteristic of a particular entity. Further, the aspect includes the entity having different characteristics according to data types. Thereby, the aspect can be defined by parameters such as entity, characteristic, values, and value formulas (e.g., data_source_table_name.column_name, or a formula derived from the data source table, where the values of the aspect are available). Example of the value formulas can be a predefined function or a stored custom function on a data record, or a calculation on select queries using operators or if else conditions. For example, the aspect "purchaser age group" can be derived using following formula (1) in select Structured Query Language (SQL) query. Examples of the aspects is depicted in Table 3.

select if(age>18,if(age>30,if(age>60,'senior citizen',
  'aged'),'youth'),'student')from purchasers  (1)

TABLE 3

| Aspect | Entity + Characteristic |
|---|---|
| Purchaser Age Group | Purchaser + Age Group |
| Purchaser Gender Group | Purchaser + Gender |
| Purchase Day Season | Purchase Time + Day season |

At 230, a number of aspect relational view tables are generated by comparing the aspects with one another based on relationship factors. The relationship factor defines a factor, by which an aspect can be compared with or related to another aspect. The relationship factors can be, but not limited to aggregation (e.g., sum and average), progression (e.g., improve, decline, constant and uneven, based on a period), comparison (e.g., minimum, maximum, equals, contains and not contain), grouping, frequency (e.g., more frequent and less frequent) and popularity (e.g., more visibility and less visibility).

Further, a relationship factor may or may not be applicable to a particular aspect. For example, the aspect "purchaser age group" may have relationship factors such as grouping and aggregation, but the aspect "purchaser age group" may not have the relationship factors such as progression and frequency, as the progression and the frequency are meant for periodic analysis. However, the relationship factors progression and the frequency are applicable for "purchase day season", which may also have relationship factors such as grouping, progression, frequency and comparison.

In one exemplary embodiment, based on the relationship factors, the aspect is compared with another aspect to generate the number of aspect relational view tables. The aspect relational view table is a combination of distinct values of the aspects. Further, the aspect relational view tables can be a data mining representation or graph visualization or a tabular result set or a simple text message. For example, the aspect "purchaser age group" and another aspect "product category type" can be linked with two relationship factors such as grouping and aggregation. Thereby, there can be two aspect relational view tables, one view is for "purchaser age group"—"grouping"—"product category type" and another view can be "purchaser age group"—"aggregation"—"product category type." The aspect relational view table is generated using query (2), for instance.

create view agegroup_ProductType as SELECT distinct $a$.agegroup,$b$.ProductType FROM purchaser as $a$,ProductDetail as $b$ (2)

At 240, at least one insight of the data records is determined by analyzing the aspect relational view tables and the master view table in multi-thread. The insights can be, but not limited to results pertaining to comparison of the data records and progression in the data records. In one exemplary embodiment, analyzing the aspect relational view tables and the master view table can be performed in two ways by a number of aspect analyzers. The number of aspect analyzers may be same as the number of the aspect relational view tables. Further, the aspect analyzers can be running in different threads corresponding to the aspect relational view tables. For example, when there are five different aspect relational view tables, there can be five aspect analyzers running in parallel in different threads.

In one example, the aspect analyzers define local iterators to fetch rows of the master view table. Further, the rows of the master view table are analyzed with the aspect relational view tables. Thereby, a master view iteration can reside inside an aspect relation view iteration. In another example, a master view iteration can be defined, where rows of the aspect relational view tables are fetched to compare with the rows of the master view table to determine the insights of the data records. Thereby, the master view iteration can enclose the aspect relation view iteration. In one exemplary embodiment, two ways of analysis can coexist by having separate master view iterator for aspect analysis. However, the iterators refer to accessing master view table. For example, consider the master view table with entities such as "date", "product item", and "sold quantity" to analyze periodic improvement of sales of the products. In one analysis, when the master view iteration is kept outside and on iterations, product sold quantity (e.g., aspect relation view table) is processed for identifying the improvement based on date wise data records from the master view iteration. In another analysis, consider another entity "product type" in the master view table. The previous analysis (e.g., when the master view iteration is kept outside) is executed for the entity "product type" (e.g., within and one another). In another analysis, the product type relation view table is iterated outside before performing the previous analysis (e.g., when the master view iteration is kept outside).

In one exemplary embodiment, the aspect analyzers may use same aspect relational view table as input for multiple analysis. Thereby, duplicating of the analysis can be avoided. For example, in one analysis (e.g., when the master view iteration is kept outside), product item is a primary field for the analysis, which may be determined using the data records in the master view table and a product item aspect relation view table. In another analysis, the product type aspect relation view table can be used for the analysis, which may not be primary field for the analysis, but can be used for determining insight of the data records. The product type aspect relational view table can be referred as secondary aspect relational view table. Further, there can be one or more secondary aspect relational view tables, accessed from the available aspect relational view tables within a workspace module.

FIG. 3 is an exemplary master view table, according to an embodiment. For example, the objective of an analysis is to find insights about sales of products in a supermarket, having multiple branches across a city. Consider a data repository storing a number of data source tables corresponding to "products", "product purchase" and "purchaser details" from different branches for a particular period (e.g., past few months). The data source table "product" may include entities such as "product id". "name", "product categories", "price", "imported time", "imported quantity", "quantity sold" and "product stock" associated with different branches of the supermarket. The data source table "product purchase" may include entities such as "purchase id", "purchaser id" and "purchase time." Further, the data source table "purchaser details" may include "purchaser name", "purchaser age". "purchaser gender", "purchaser address". "purchaser profession" and "purchase mode."

Based on multi-threaded analytical process described in FIG. 2, a master view table is generated with the entities for analytics as depicted in FIG. 3. For example, the master view table includes entities such as "product name" 310, "product category" 320, "purchase time" 330, "quantity sold" 340, "customer gender" 350 and "branch" 360. Further, a number of aspects are determined from the master view table. For example, the aspects such as "purchase day season", "purchaser age group", "product category type" and "purchaser gender group" are determined.

In one exemplary embodiment, a number of aspect relational view tables are generated by comparing one aspect with another aspect based on relationship factors. For example, the aspect "purchase day season" is compared with "purchaser age group" with relationship factor grouping as depicted in Table 4. Further, different aspect relational view tables can be generated for different aspects and the corresponding relationship factors.

TABLE 4

| Day Period | Purchase Date | Age group |
|---|---|---|
| Morning | 10 Jun. 2015 | Youth |
| Evening | 11 Jun. 2015 | Youth |
| Afternoon | 12 Jun. 2015 | Kid |
| Evening | 13 Jun. 2015 | Senior Citizen |

FIG. 4 is an exemplary algorithm associated with an aspect analysis, according to an embodiment. Aspect relational view tables and the master view table are analyzed in multi-thread to determine insights of data records. During analytics, an aspect relational view table (e.g., Table 4) is compared with a master view table (e.g., FIG. 3), as described in process block 240 of FIG. 2. For example, when the aspect relational view table (e.g., table 4) is analyzed with the master view table (e.g., FIG. 3), different insights of sales of products such as particular products sold in a particular branch, in a large amount from morning to afternoon. And the same products are sold in another branch, in a different region during evening time, which may help to optimize the transportation of the products effectively.

In one exemplary embodiment, the algorithm for the analysis can be a predefined analysis algorithm and/or a user defined analysis algorithm. The predefined analysis algorithm can be implemented within an analytical application, either as a manual or automated algorithm. The user defined analysis algorithm can be defined or extended dynamically, by an analytical expert, for a particular scenario. From the exemplary algorithm in FIG. 4, different result sets can be generated using programming language codes (e.g., Java®). One set of result for morning (e.g., 410) and another set of result for evening (e.g., 420). Further, from the result sets, different insights can be determined such as the morning result set (e.g., 410) has more number of entries, from the branch "Indira Nagar" and the evening result set has more number of entries from the branch "Whitefield", which may help the seller to optimize transportation of the product by completing transportation to "Indira Nagar" branch in the morning, and transport the products by afternoon to "Whitefield" branch. Further, the morning result set has more number of entries, for the gender "Female", and the evening result set has more number of entries for the gender "Male" (e.g., 430). Also, there can be many such analysis, running in parallel, in multi-threaded environment, which can bring different result sets, which can assist users to identify maximum number of insights. With the described process, multiple result sets (e.g., aspect relational view tables) can be executed simultaneously and reused for multiple analysis. In addition, when new data changes and new data structure updates are received at a data repository, the master view table will be automatically updated.

Some embodiments may include the above-described methods being written as one or more software components. These components, and the functionality associated with them, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computing system that is remotely located from a second computing system containing an interface level (e.g., a graphical user interface). These first and second computing systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computing system which causes the computing system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 5:
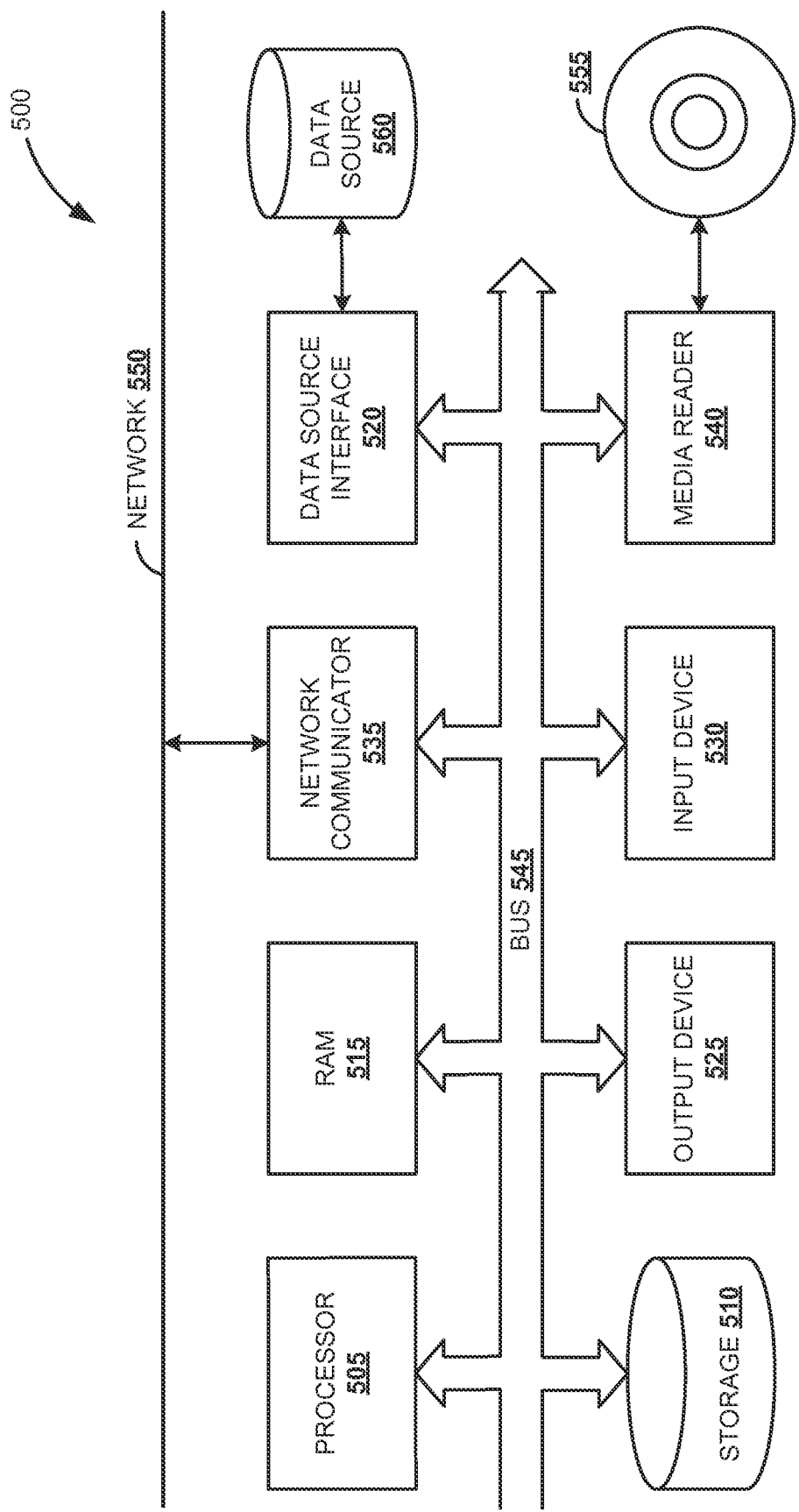
FIG. 5 is a block diagram of an example computing system, according to an embodiment.

FIG. 5 is a block diagram of example computing system 500, according to an embodiment. The computing system 500 includes a processor 505 that executes software instructions or code stored on a computer readable storage medium 555 to perform the above-illustrated methods. The processor 505 can include a plurality of cores. The computing system 500 includes a media reader 540 to read the instructions from the computer readable storage medium 555 and store the instructions in storage 510 or in random access memory (RAM) 515. The storage 510 provides a large space for keeping static data where at least some instructions could be stored for later execution. According to some embodiments, such as some in-memory computing system embodiments, the RAM 515 can have sufficient storage capacity to store much of the data required for processing in the RAM 515 instead of in the storage 510. In some embodiments, the data required for processing may be stored in the RAM 515. The stored instructions may be further compiled to generate other representations of the instructions and dynamically stored in the RAM 515. The processor 505 reads instructions from the RAM 515 and performs actions as instructed. According to one embodiment, the computing system 500 further includes an output device 525 (e.g., a display) to provide at least some of the results of the execution as output including, but not limited to, visual information to users and an input device 530 to provide a user or another device with means for entering data and/or otherwise interact with the computing system 500. One or more of these output devices 525 and input devices 530 could be joined by one or more additional peripherals to further expand the capabilities of the computing system 500. A network communicator 535 may be provided to connect the computing system 500 to a network 550 and in turn to other devices connected to the network 550 including other clients, servers, data stores, and interfaces, for instance. The modules of the computing system 500 are interconnected via a bus 545. Computing system 500 includes a data source interface 520 to access data source 560. The data source 560 can be accessed via one or more abstraction layers implemented in hardware or software. For example, the data source 560 may be accessed by network 550. In some embodiments the data source 560 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the embodiments are described herein for illustrative purposes, various equivalent modifications are possible within the scope of the embodiments, as those skilled in the relevant art will recognize. These modifications can be made in light of the above detailed description. Rather, the scope is to be determined by the following claims, which are to be interpreted in accordance with established doctrines of claim construction.

What is claimed is:

1. A non-transitory computer-readable medium storing instructions, which when executed by a computer cause the computer to:
generate a master view table by retrieving data records corresponding to a plurality of entities from one or more data source tables based on a master table view query;
determine a plurality of aspects from the generated master view table based on the plurality of entities in the generated master view table, wherein each aspect is defined by a value formula based on at least one of a predefined function, a stored custom function on a data record, or a calculation on select queries of the plurality of entities using operators or conditional statements;
determine, based on the determined plurality of aspects, a set of relationship factors between the determined plurality of aspects, wherein each of the set of relationship factors identify a predetermined comparison with or relation to two or more different aspects, and wherein the set of relationship factors comprise at least one of aggregation, progression, frequency and popularity;
in response to determining the set of relationship factors, generate a plurality of aspect relational view tables by comparing a particular aspect of the determined plurality of aspects with each of the other aspects of the determined plurality of aspects based on the determined set of relationship factors; and
determine at least one insight of the data records by analyzing the plurality of aspect relational view tables and the master view table in multi-thread, wherein determining the at least one insight of the data records by analyzing the plurality of generated aspect relationship view tables and the master view table in multi-thread comprises:
generating a number of analytical analyzer threads corresponding to a number of generated aspect relational view tables; and
generating insights, by each of the analytical analyzer threads, in parallel in different threads.

2. The non-transitory computer-readable medium of claim 1, wherein the plurality of aspect relational view tables comprise combinations of distinct values of the plurality of aspects.

3. The non-transitory computer-readable medium of claim 1, wherein the plurality of aspect relational view tables and the master view table in the multi-thread are analyzed in parallel by a number of aspect analyzers.

4. The non-transitory computer-readable medium of claim 1, wherein analyzing the plurality of aspect relational view tables and the master view table in the multi-thread comprises defining a local iterator to fetch rows of the master view table and analyzing the rows of the master view table with the plurality of aspect relational view tables.

5. The non-transitory computer-readable medium of claim 1, wherein analyzing the plurality of aspect relational view tables and the master view table in multi-thread comprises defining a master view iteration, wherein rows of the plurality of aspect relational view tables are fetched to compare with rows of the master view table.

6. The non-transitory computer-readable medium of claim 1, wherein the master view table is generated by a workspace module based on an objective of an analysis.

7. A computer implemented method to provide multi-threaded data analytics, comprising:
generating a master view table by retrieving data records corresponding to a plurality of entities from one or more data source tables based on a master table view query;
determining a plurality of aspects from the generated master view table based on the plurality of entities in the generated master view table, wherein each aspect is defined by a value formula based on at least one of a predefined function, a stored custom function on a data record, or a calculation on select queries of the plurality of entities using operators or conditional statements;
determining, based on the determined plurality of aspects, a set of relationship factors between the determined plurality of aspects, wherein each of the set of relationship factors identify a predetermined comparison with or relation to two or more different aspects, and wherein the set of relationship factors comprise at least one of aggregation, progression, frequency and popularity;
in response to determining the set of relationship factors, generating a plurality of aspect relational view tables by comparing a particular aspect of the determined plurality of aspects with each of the other aspects of the determined plurality of aspects based on the determined set of relationship factors; and determining at least one insight of the data records by analyzing the plurality of aspect relational view tables and the master view table in multi-thread, wherein determining the at least one insight of the data records by analyzing the plurality of generated aspect relationship view tables and the master view table in multi-thread comprises:

generating a number of analytical analyzer threads corresponding to a number of generated aspect relational view tables; and generating insights, by each of the analytical analyzer threads, in parallel in different threads.

8. The computer implemented method of claim 7, wherein the plurality of aspect relational view tables comprise combinations of distinct values of the plurality of aspects.

9. The computer implemented method of claim 7, wherein the plurality of aspect relational view tables and the master view table in the multi-thread are analyzed in parallel by a number of aspect analyzers.

10. The computer implemented method of claim 7, wherein analyzing the plurality of aspect relational view tables and the master view table in the multi-thread comprises defining a local iterator to fetch rows of the master view table and analyzing the rows of the master view table with the plurality of aspect relational view tables.

11. The computer implemented method of claim 7, wherein analyzing the plurality of aspect relational view tables and the master view table in multi-thread comprises defining a master view iteration, wherein rows of the plurality of aspect relational view tables are fetched to compare with rows of the master view table.

12. The computer implemented method of claim 7, wherein the master view table is generated by a workspace module based on an objective of an analysis.

13. A computing system to provide multi-threaded data analytics, comprising:

at least one processor; and one or more memory devices communicative with the at least one processor, wherein the one or more memory devices store instructions to:

generate a master view table by retrieving data records corresponding to a plurality of entities from one or more data source tables based on a master table view query;

determine a plurality of aspects from the generated master view table based on the plurality of entities in the generated master view table, wherein each aspect is defined by a value formula based on at least one of a predefined function, a stored custom function on a data record, or a calculation on select queries of the plurality of entities using operators or conditional statements;

determine, based on the determined plurality of aspects, a set of relationship factors between the determined plurality of aspects, wherein each of the set of relationship factors identify a predetermined comparison with or relation to two or more different aspects, and wherein the set of relationship factors comprise at least one of aggregation, progression, frequency and popularity;

in response to determining the set of relationship factors, generate a plurality of aspect relational view tables by comparing a particular aspect of the determined plurality of aspects with each of the other aspects of the determined plurality of aspects based on the determined set of relationship factors; and determine at least one insight of the data records by analyzing the plurality of aspect relational view tables and the master view table in multi-thread, wherein determining the at least one insight of the data records by analyzing the plurality of generated aspect relationship view tables and the master view table in multi-thread comprises:

generating a number of analytical analyzer threads corresponding to a number of generated aspect relational view tables; and generating insights, by each of the analytical analyzer threads, in parallel in different threads.

14. The computing system of claim 13, wherein the plurality of aspect relational view tables comprise combinations of distinct values of the plurality of aspects.

15. The computing system of claim 13, wherein the plurality of aspect relational view tables and the master view table in the multi-thread are analyzed in parallel by a number of aspect analyzers.

16. The computing system of claim 13, wherein analyzing the plurality of aspect relational view tables and the master view table in the multi-thread comprises defining a local iterator to fetch rows of the master view table and analyzing the rows of the master view table with the plurality of aspect relational view tables.

17. The computing system of claim 13, wherein analyzing the plurality of aspect relational view tables and the master view table in multi-thread comprises defining a master view iteration, wherein rows of the plurality of aspect relational view tables are fetched to compare with rows of the master view table.

* * * * *